No. 614,059. Patented Nov. 8, 1898.
J. NOBLE.
ART OF AND APPARATUS FOR DRAWING CLEAR WATER FROM BODIES OF WATER.
(Application filed June 28, 1897.)
(No Model.)
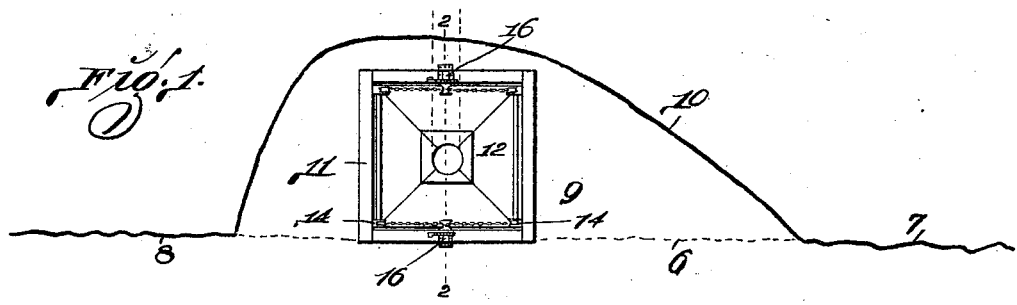
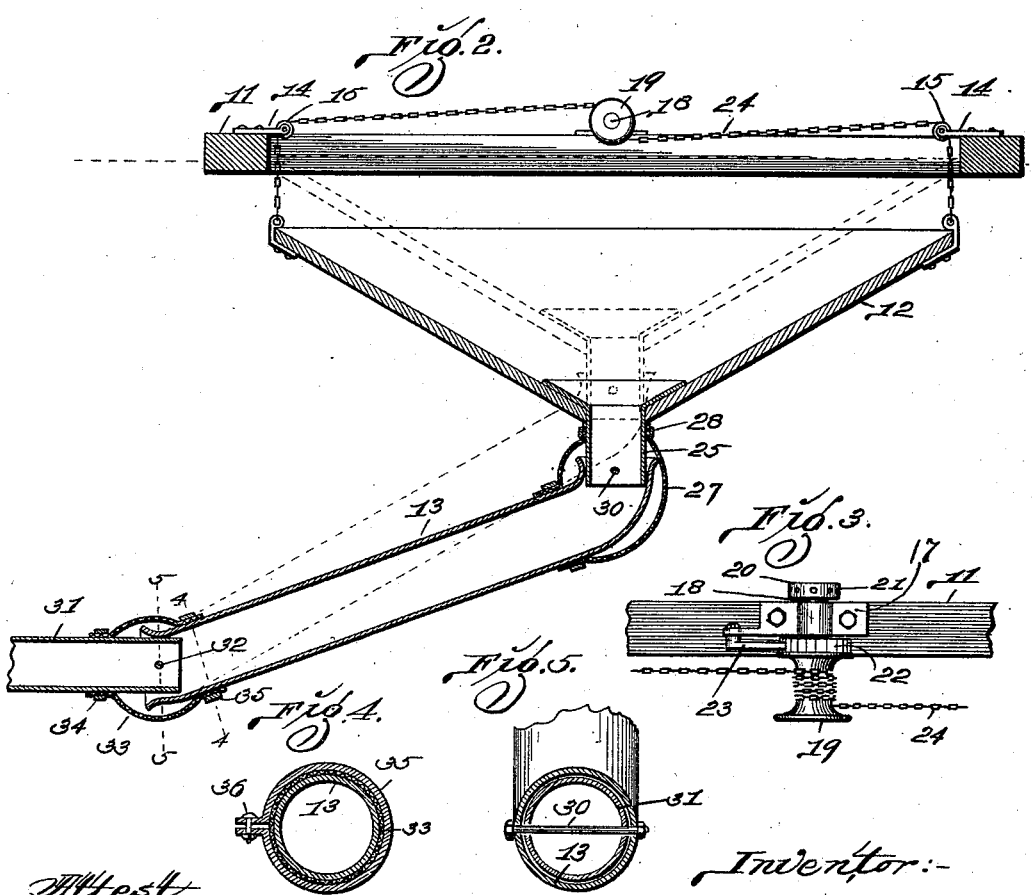

UNITED STATES PATENT OFFICE.

JAY NOBLE, OF ST. LOUIS, MISSOURI, ASSIGNOR TO THE JAY NOBLE WATER CLARIFYING COMPANY, OF SAME PLACE.

ART OF AND APPARATUS FOR DRAWING CLEAR WATER FROM BODIES OF WATER.

SPECIFICATION forming part of Letters Patent No. 614,059, dated November 8, 1898.

Application filed June 28, 1897. Serial No. 642,730. (No model.)

*To all whom it may concern:*

Be it known that I, JAY NOBLE, of the city of St. Louis, State of Missouri, have invented certain new and useful Improvements in the Art of and Apparatus for Drawing Clear Water from Bodies of Water, of which the following is a full, clear, and exact description, reference being had to the accompanying drawings, forming a part hereof.

My invention relates to an apparatus for drawing clear water from bodies of water, and is an improvement on the subject-matter of Patent No. 538,461, granted to me April 30, 1895; and it consists of the novel construction, combination, and arrangement of parts hereinafter shown, described, and claimed.

By experiments, observation, and careful study I have discovered that in the natural process of purifying water the decomposition of animal and vegetable matter contained in the water causes a continuous settling operation which carries the impurities of the body of water toward the bottom. All bodies of water which are not too violently agitated are comparatively clear at their surface and contain the largest amount of impurities at their bottom.

Figure 1 is a plan of my apparatus for drawing water from a running stream in position for use and illustrating my process. Fig. 2 is a vertical section taken approximately on the line 2 2 of Fig. 1. Fig. 3 is a detail plan, on an enlarged scale, showing the means of adjusting the apparatus, parts being broken away to economize space. Fig. 4 is a cross-section taken approximately on the line 4 4 of Fig. 2. Fig. 5 is a cross-section taken approximately on the line 5 5 of Fig. 2.

Referring by numerals to the drawings, the dotted line 6 and the blank lines 7 and 8, extending from each end of the dotted line 6, represent the natural bank of a running stream. Beginning at the dotted line 6, I excavate the reservoir 9 in the bank, said reservoir being bounded by the black line 10, and I place my apparatus in said reservoir. It is to be understood, however, that the apparatus may be used in any reservoir or in any body of water and without reference to a running stream.

The apparatus consists of the square or rectangular floating boom 11, the funnel-shaped intake 12, adjustably attached to the boom, and the flexible pipe 13, leading from the intake. The boom 11 consists of timbers framed together in the form of a square or rectangle and entirely inclosing the space above the intake 12. Arms 14 extend inwardly from the corners of the boom, and grooved pulleys or rollers 15 are mounted in the inner ends of said arms. The capstan 16 is mounted upon each of the end pieces of the boom 11 and approximately at their centers. The capstans are constructed as shown in detail in Fig. 3. A bearing 17 is mounted upon the timber of the boom. The shaft 18 is mounted in the bearing. The capstan-pulley 19 is mounted upon the inner end of the shaft. A head 20 is mounted upon the opposite end of the shaft from the pulley 19, there being apertures 21 formed in the periphery of said head to receive a crowbar for rotating the head. A ratchet-wheel 22 is mounted upon the shaft beside the pulley 19, and a pawl 23 is connected to the bearing 17 and engages the teeth of the ratchet-wheel. The chains 24 are attached to the corners of the intake 12 and extend upwardly over the rollers 15 and are attached to the pulleys 19. The intake is raised and lowered relative to the boom by operating the capstan to wind or unwind the chains 24. A short pipe 25 leads downwardly from the center of the intake 12 into the upper end of the pipe 26. A flexible pipe 27, formed of oil canvas or rubber canvas, or any suitable material, is placed around the joint formed by the pipes 25 and 26. A clamp 28 is placed around the upper end of the flexible pipe 27 to hold said pipe securely in position relative to the pipe 25 and form a tight joint, and a similar clamp 29 is placed around the lower end of the pipe 27 and secures said pipe to the pipe 26. A bolt 30 is inserted through the upper end of the pipe 26 and through the lower end of the pipe 25, thus forming a knuckle-joint. The pipe 31 leads from the waterworks and is inserted in the lower end of the pipe 26. A bolt 32 is inserted through the lower end of the pipe 26 and through the end of the main pipe 31, thus forming a knuckle-joint. A flexible pipe 33 is placed over the joint between the pipes 26 and 31. A clamp 34 connects one end of the pipe 33 to the main pipe 31, and a clamp 35 connects the opposite end of the pipe 33 to the pipe 26. The clamps 28, 29, 34, and 35 are substantially alike and are constructed as shown in Fig. 4, and each consists of a band encircling the pipe, the ends of the band being turned outwardly and adjustably connected together by means of a bolt 36. The upper edge of the intake 12 is of such a size that it will readily pass upwardly inside of the boom, and by manipulating the capstans the intake is adjusted up and down relative to the boom, and I prefer, where the condition of the water requires, to set the upper edge of the intake about an inch below the surface of the water. The boom passes entirely around the intake and prevents objects which float upon the surface of the water from passing into the intake, and the water which passes under the boom into the intake will be clear and free from foreign matter.

I claim—

1. In a device of the class described, an intake, a floating boom surrounding said intake, capstans carried by said boom, flexible connections between the intake and said capstans, and a flexible tubular connection from the intake to the water-main, substantially as specified.

2. In a device of the class described, an intake, a floating boom surrounding said intake, capstans carried by said floating boom, flexible connections from the intake to the capstans, which flexible connections and capstans provide means for raising and lowering the intake, jointed tubes leading from the intake to the water-main, and flexible waterproof casings for the joints between said tubular connections, substantially as specified.

3. In a device of the class described, an intake, a flexible tubular connection from said intake to the water-main, a floating boom surrounding said intake, bearings mounted upon said boom, a capstan arranged for rotation in said bearings, a ratchet-wheel carried by said capstan, a pawl carried by the bearing for engaging the teeth of the ratchet-wheel, and flexible connections from the intake to the capstan, which flexible connections and capstan serve as means for raising and lowering the intake in the manner set forth and for the purposes stated.

In testimony whereof I affix my signature in presence of two witnesses.

JAY NOBLE.

Witnesses:
 EDWARD E. LONGAN,
 A. J. MCCAULEY.